May 2, 1967  J. R. JOHNSTON ET AL  3,316,582

VISCOUS LIQUID DAMPING DEVICES

Filed Oct. 23, 1964  4 Sheets-Sheet 1

INVENTORS
JAMES R. JOHNSTON
WILLIAM W. HIGGINBOTHAM
BY

ATTORNEY

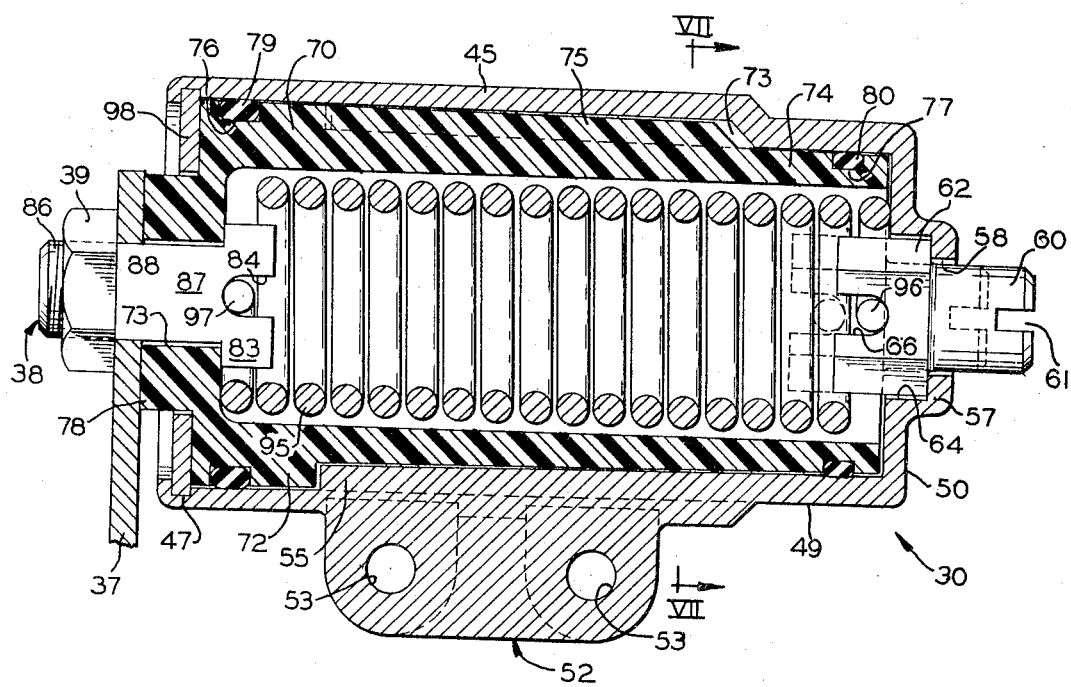
FIG. 6
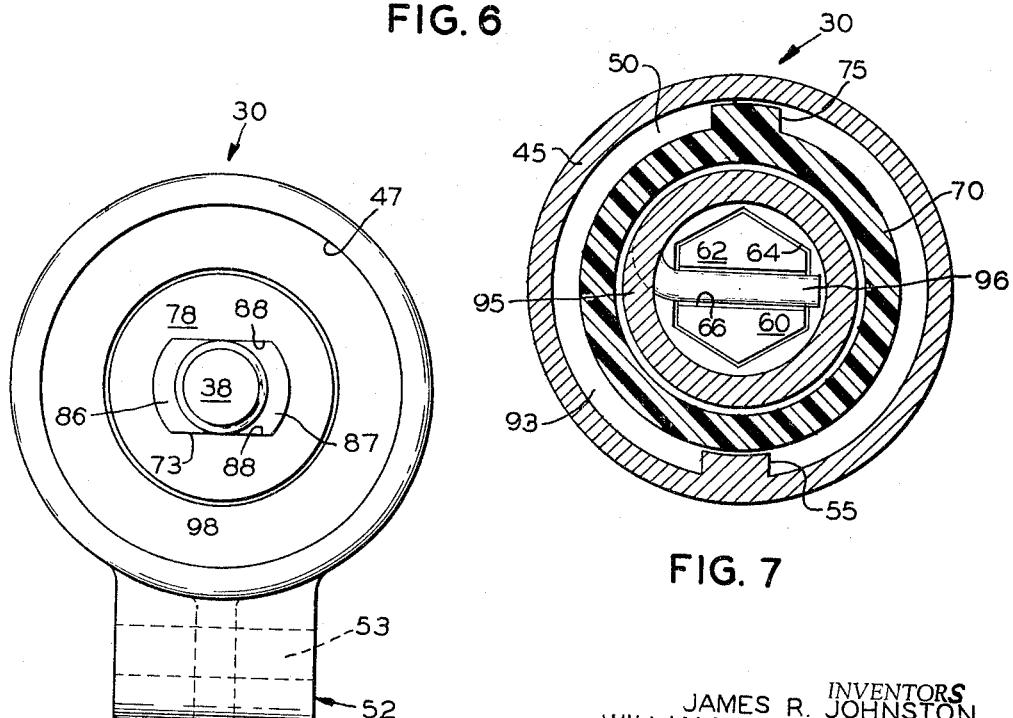
FIG. 7
FIG. 9
INVENTORS
JAMES R. JOHNSTON
WILLIAM W. HIGGINBOTHAM
BY
ATTORNEY May 2, 1967    J. R. JOHNSTON ETAL    3,316,582
VISCOUS LIQUID DAMPING DEVICES
Filed Oct. 23, 1964    4 Sheets-Sheet 4

INVENTORS
JAMES R. JOHNSTON
WILLIAM W. HIGGINBOTHAM
BY
Hugh A. Kirk
ATTORNEY

United States Patent Office 3,316,582
Patented May 2, 1967

3,316,582
VISCOUS LIQUID DAMPING DEVICES
James R. Johnston, Monroe, and William W. Higginbotham, Britton, Mich., assignors to Ridge Products, Inc., Britton, Mich., a corporation of Michigan
Filed Oct. 23, 1964, Ser. No. 405,923
10 Claims. (Cl. 16—51)

This invention relates to damping devices, such as door checks or closers and the like, and is particularly directed to rotary viscous liquid dampers including checking means for inwardly or outwardly opening either right or left hand doors to 180°.

An object of the present invention is to provide a simple, efficient, comfortable to operate rotary check of compact size and pleasing appearance but with high damping and latching power, and a slow but an immediate response.

Another object of the invention is to provide a rotary damper utilizing a high viscosity silicone oil to permit increased tolerance between rotor and stator without any valves and ducts to and from them, and in which the damping action is direct and is effective throughout a wide variation of temperature.

A further object of the invention is to provide a rotary hydraulic damper with a rotor of thermoplastic resin in a metallic casing having a lower coefficient of expansion than the rotor to compensate for variations in oil viscosity to provide uniform damping under variations in temperature.

A further object of the invention is to provide a damper with readily accessible means to vary the tension on, as well as the direction of tension of, a return spring.

A further object of the invention resides in the provision of a damper wherein speed change is effected by varying the spring load rather than in changing the size of an oil flow passage or orifice.

Generally speaking, this invention comprises a rotary hydraulic damper or checking means having an outer casing of compact size which may be a casting, such as a die casting, formed with an integral mounting boss attachable to a mounting bracket which may be fixed to a stationary member such as a door jamb or to a pivoted or hinged member such as a door. Within this outer casing is rotatably mounted a cylindrical rotor or barrel which may be held and sealed therein by a cover over the end of the casing. This rotor may divide the casing into concentric inner and outer chambers, the inner chamber serving to receive a spring and the outer chamber containing a fluid such as a viscous liquid having a viscosity of above about 10,000 centistokes. The rotor, which may be formed of a moldable plastic material, has an integral vane or blade having an aperture and/or a clearance at one end to provide a passage for the high viscosity liquid from one side of the vane to the other upon rotation of the rotor by linkage connected to the top of the rotor. The linkage may be arranged to permit the door or other movable member to be swung substantially 180°. A helical torsion spring having an end connected to the top of the rotor is concentrically arranged with the rotor and may be located within the inner chamber, and has its lower or other end attached to a spring adjuster, having a polygonal, such as a hexagonal head located in a complementary polygonal seat in the base of the outer casing. Spring tension may be adjusted by forcing the spring adjuster axially of the spring out of its seat and then rotating the adjuster, and tension direction may be changed to adapt the damper for oppositely swinging movable members.

The above mentioned and other features and objects of this invention and the manner of attaining them will become more apparent and the invention itself will be understood best by reference to the following description of embodiments of the invention taken in conjunction with the accompanying drawings, wherein:

FIG. 6 is an enlarged vertical sectional detail view of the closer shown in FIG. 4, with the spring adjusting member in its inward adjusting position shown in dotted lines;

FIG. 7 is a sectional detail view taken on line VII—VII of FIG. 6;

FIG. 9 is a top plan view of the closer shown inn FIG. 6 with the nut and lever omitted;

Figure 1:
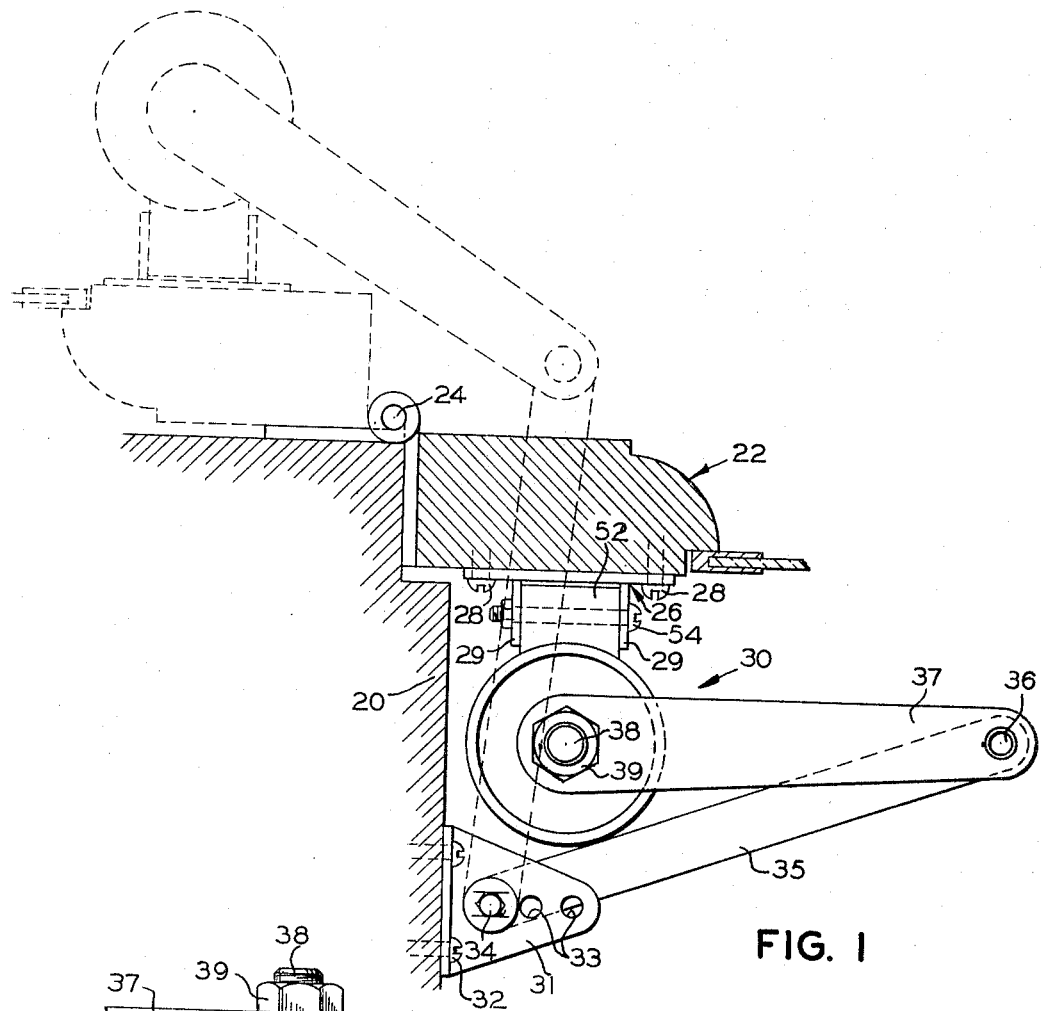
FIG. 1 is a top plan view, with portions broken away, showing a closer according to this invention attached to an outwardly opening screen or storm door in closed position and illustrating in broken lines that the door can be opened 180°.
Figure 5:
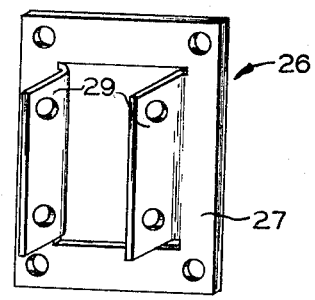
FIG. 5 is a perspective view of the mounting bracket for the closer shown in FIGS. 1 and 2.

Referring to the drawings, FIG. 1 illustrates a typical installation of the invention incorporated in a door closer, numeral 20 designating a door frame and 22 a portion of a door, which may be a screen or storm door, hinged at 24 to the frame 20. Fixed to door 22 is a bracket 26 which may comprise an apertured frame 27 for attachment to a door by screws 28 and a pair of parallel outwardly extending apertured flanges 29 (see FIG. 5) which in turn supports a closer indicated generally at 30.

Attached to the door frame 20 is a bracket 31 which may be of angular form as shown with one portion secured as by screws 32 to the frame 20 and to the other portion having a plurality of holes 33 into one of which is pivoted by a removable pin 34 at one end of a link 35. To the other end of link 35 is pivoted such as by a rivet 36 to a lever 37 the other end of which is secured to the outer end of a shaft 38 such as by means of a nut 39 or other fastening means, the shaft 38 forming part of the closer 30 as later described.

The closer 30 may be mounted at the top of the door 22 or at any other convenient place as desired. By means of the arrangement shown in FIG. 1, the door 22 is capable of being opened substantially 180° due to linkage 33 and 35 and the construction of the closer 30 hereinafter described. While the door 22 is shown as being hinged to the left side of the frame 22 for outward swinging movement, it can be hinged to the right side thereof as well.

Figure 2:
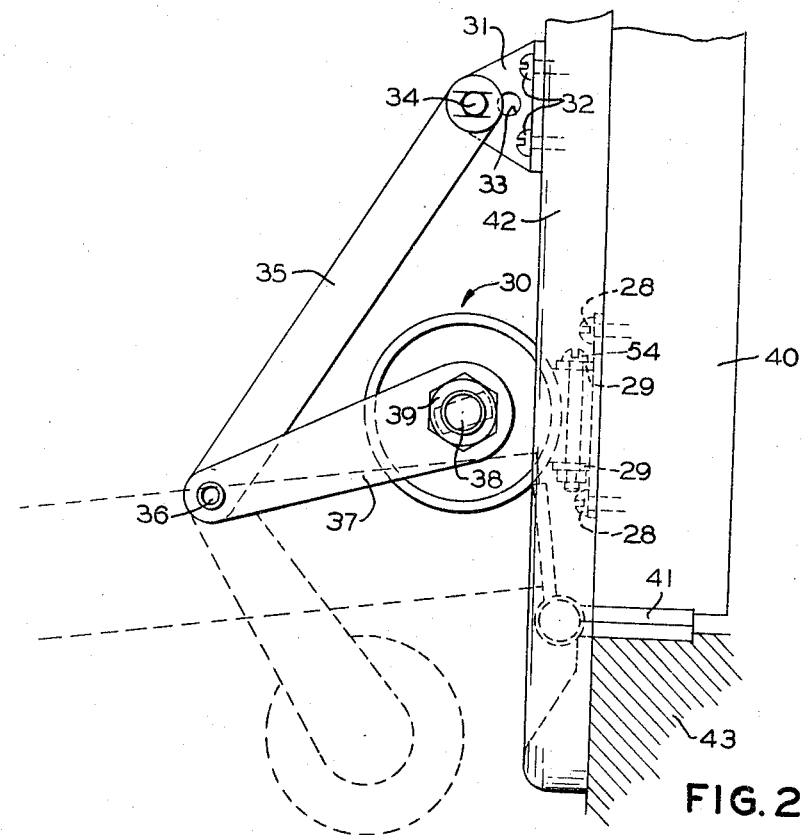
FIG. 2 is a top plan view, with portions broken away, showing the closer of FIG. 1 attached to an inwardly opening door and illustrating in broken lines a partially open position of the door.
Figure 8:
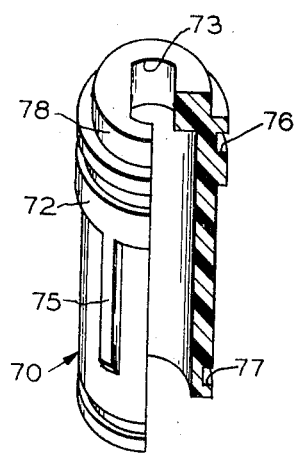
FIG. 8 is a quarter sectional perspective view of a rotor for use with the closer shown in FIGS. 6 and 7.
Figure 3:
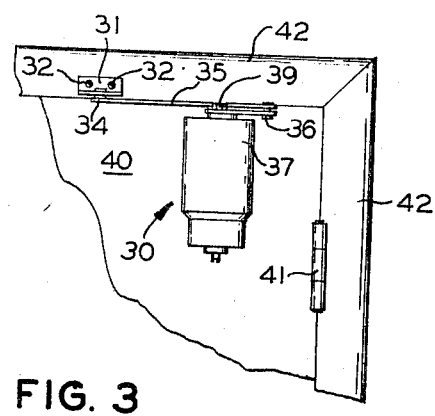
FIG. 3 is an elevational view of the parts shown in FIG. 2.

Another installation is shown in FIGS. 2 and 3 wherein the closer 30 is secured to an inwardly swinging door 40 hinged at 41 to door jamb 43. As shown, the bracket 31 is secured to the door jamb or casing 42 over the door opening. As in the case of the installation of FIG. 1, the door 40 may be opened substantially 180° although the broken lines illustrate the door only in partially open position.

As particularly shown in FIGS. 6 and 7, the damper 30 is inclusive of a stator or outer casing 45, a rotor or inner barrel 70 and an adjustable spring means 95 therebetween to be torsioned by the rotation of the rotor 70. Anchor means for opposite ends of the spring are fixed respectively to the casing 45 and rotor 70 and a chamber 93 for the highly viscous cushioning liquid is provided between the rotor 70 and stator casing 45 to retard or dampen the rotation of the rotor 70.

In this form of the invention the outer generally cup-shaped casing 45 may have an initially open top end 47, a lower end portion of slightly reduced diameter at 49 and a bottom 50. Projecting outwardly from one side of casing 45 may be a double boss 52 having parallel apertures 53 for attachment by parallel bolts 54 (see FIGS. 1 and 2) between the aligned apertures in the flanges 29 of the mounting bracket 26. Extending longitudinally within the casing 45 is a stop or vane means 55, which may be integral with the inner wall, to provide an abutment or reaction member. The vane 55 extends from the reduced portion 49 upwardly and terminates at a point spaced below or inwardly of the end 47 of the casing 45.

The bottom 50 is provided with a central boss 57 apertured at 58 to receive an adjusting member 60 having a tool slot at 61 and a hexagonal or other multi-sided head portion 62 seated in a complementary polygonal recess 64 in the inner bottom wall of the casing 45. The head 62 has a cross slot 66 to receive one end of the torsion spring means 95. In adjusting the torsion on the spring means 95, the member 60 is pushed inwardly of the casing 45 into the dotted line position shown in FIG. 6 so as to be out of the recess 64 so it can then be rotated in the direction and to the torsion desired before being reset into the recess 64 which then holds the torsion until re-adjusted.

The casing 45 is divided into two concentric chambers by means of the generally cylindrical cup-shaped rotor 70 of a molded plastic material, such as a thermoplastic acetal resin, for example of "Delrin" manufactured by E. I. du Pont de Nemours and Co., Inc. or an ethyl cellulose plastic, for example "Celcon," manufactured by Celanese Corporation of America, or the like, provided with an enlarged head end portion 72 for bearing in the casing 45 above the vane 55, and a reduced other end portion 74 fitting and bearing in the lower end portion 49. Extending between portions 72 and 74 is a vane or blade 75 integral with the outer wall of the rotor 70. Adjacent the opposite ends of rotor 70 are circumferential grooves 76 and 77 in which are located O-rings 79 and 80, respectively, for sealing the bearing portions of the rotor 70 to the casing 45. Projecting from the upper end of rotor 70 is an actuating member, stem or shaft 38 having a head 83 in which is provided a cross slot 84 and an outer threaded end 86. The central portion 87 of the stem 38 may have opposed flats 88 or other irregular contour means receivable in a complementary irregularly contoured aperture 73 in the head of the rotor 70. Stem 38 projects outwardly to receive an actuating lever 37 retained thereon by means such as nut 39.

Concentrically within rotor 70 is arranged a helical torsion spring 95 having its opposite ends 96 and 97 positioned diametrically of the helix in cross slots 66 and 84, respectively. During operation, the damper spring end 96 is held stationary in member 60 and torsion is built up by rotation of the rotor 70 by manipulation of lever 37.

Within the space or chamber 93 provided by the space between the casing 45 and the rotor 70 and O-rings 79 and 80 may be a supply of high viscosity liquid which flows from one side of vane 75 to the other during operation of the damper, there being predetermined clearance or an aperture by the vane 75 and the casing to accommodate such flow such as clearance 73 at one end of the vane 75 (see (FIG. 6). The clearance is such that a retarding or cushioning effect is applied to the rotation of the rotor including its return rotation during unwinding of spring 95. The viscous liquid in chamber 93 is of a type having a viscosity of between about 10,000 and 500,000 centistokes or more, and preferably between about 20,000 and 300,000 centistokes, and specifically about 60,000 centistokes and having having a substantially constant viscosity-temperature ratio between about 0° and 100° C. and preferably between −50° C. and 150° C., for example Dow Corning Silicon Fluids 200 or 210. However, any slight changes in the viscosity of this liquid with changes in temperature is automatically compensated for by the difference in coefficients of expansion between the metal housing 45 and plastic rotor 70 which correspondingly regulates the clearance between said parts.

In assembling the closer 30, the rotor is assembled by placing the O-rings 79 and 80 in its grooves 76 and 77 respectively, the stem 38 is placed inside the rotor 70 through its larger end, and then spring means 95 is placed into the rotor inner chamber. Separately the adjustable member 60 is placed in the aperture 58 in the casing 45 and then the rotor assembly is partly inserted into the open end of the casing 45 with the head portion 72 of the rotor extending beyond the upper edge 47 of the casing or housing for insertion of a measured amount of the viscous liquid into the chamber 93, which when added, the rotor assembly is moved into the position shown in FIG. 6. An apertured end washer, or cover or lid 98 is then placed over the boss end 78 of the rotor 75 and the edge 47 of the housing may then be flanged, bent or spun inwardly over its top peripheral edge to permanently hold the rotor 70, liquid, spring 95, and stem members 38 and 60 together. The lever 37 with its link 35 pivoted thereto is left for assembly by the user so it can be mounted on either side of the housing or casing 45 depending whether it is to be used inside or outside or on the left or the right of a door.

Figure 4:
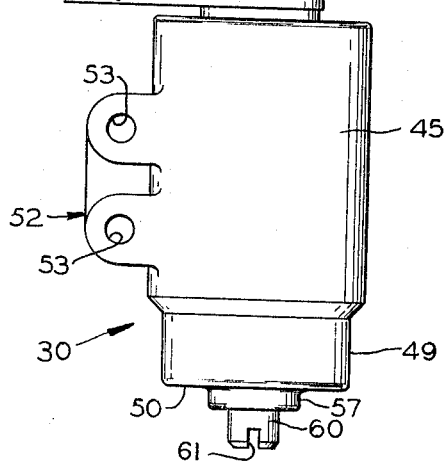
FIG. 4 is a side elevation of one embodiment of the invention which may be used in the installations shown in FIGS. 1, 2 and 3.

As illustrated in FIG. 4, which is substantially to actual size, the device 30 is very compact and lends itself to installation in many environments. For example, dampers of compact dimensions have utility not only as door closers but also in many situations in which there are fixed and hinged or movable members.

Figure 10:
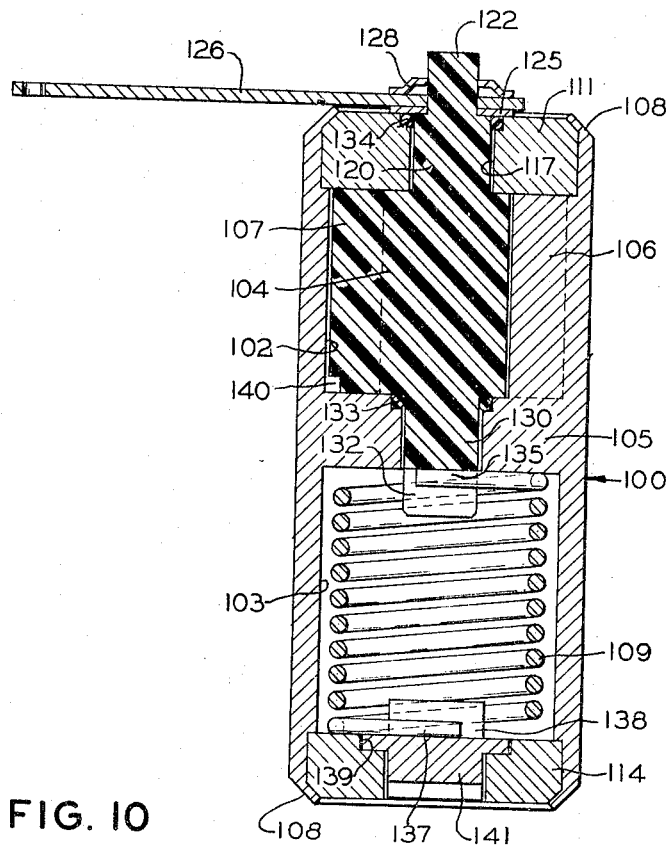
FIG. 10 is a vertical sectional detail view of another form of the invention.
Figure 11:
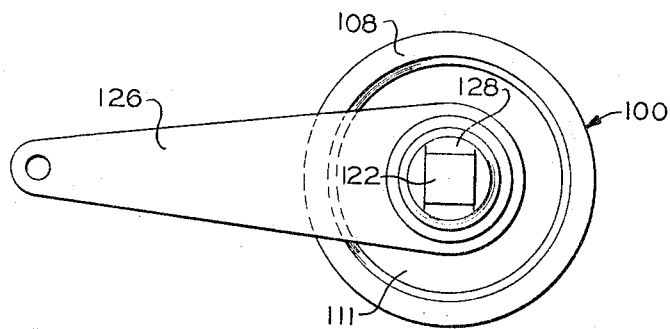
FIG. 11 is a top plan view of the closer shown in FIG. 10.

An alternate construction is shown in FIGS. 10 and 11 in which a casing 100 may have a rotor chamber 102 and a spring chamber 103 coaxially arranged, the rotor 104 being solid and the rotor or fluid chamber 102 being above the spring chamber 103.

The casing 100, which may also be a die casting, is initially open at both ends, has the cylindrical spring chamber 103 adjacent the bottom thereof and the second generally cylindrical chamber 102 above or adjacent the top of the casing 100, and has centrally apertured partition 105 separating the two chambers. The rotor chamber 102 is provided with a rib or abutment 106 interiorly thereof, while the rotor 104 has a blade or vane 107 projecting from one side to retard the return oscillation of the rotor due to the influence of spring 109, the viscous liquid in chamber 102 serving to cushion or dampen such action.

In the upper end of casing 100 is a plug or end plate 111 while in the lower end thereof a generally similar plug 114 may be provided, each such plug being retained in the casing by spinning the outer edges of the end walls 108 into engagement with the plugs 111 and 114 as shown. Centrally of plug 111 is a hole 117 through which the shaft end 120 of rotor 104 extends, the outer end 122 of which is of square or other suitable shape to receive a washer 125 and lever 126 having a similarly shaped opening 128 therein. The lever 126 may be retained on shaft 120 by means of a spring or other type fastener 128.

The rotor 104 is sealed from the casing exterior by means of O-rings 133 and 134 in grooves in the end of plug 111 and aperture of the central partition 105, respectively. The inner or lower end of rotor 104 has a shaft portion 130 extending into the spring chamber, such shaft portion 130 having a cross slot 132 for receiving one end 135 of spring 109 so that upon movement of lever 126 in one direction, torsion is applied to the helical spring 109. The other end 137 of spring 109 is located in a cross slot 138 in an adjusting hexagonal nut 141 normally located in a complementary hexagonal recess 139 in plug 114 in the bottom of casing 100.

The vane 107 on rotor 104 is formed or provided with a fixed passageway or aperture 140 for the viscous damping liquid as used in the first embodiment described above, which passageway 140 is of predetermined size to pass liquid from one side of vane 107 during oscillation of the rotor in both directions. The relative movement of the rotor in one direction is capable of winding or torsioning spring 109, while movement in the opposite direction is restricted by the viscosity of the liquid passing through the predetermined fixed passageway 140.

If desired, other conventional types of fastening means may be used for assembly and pivoting the parts of this invention without departing from its scope.

While there is described above the principles of this invention in connection with specific apparatus, it is to be clearly understood that this description is made only by way of example and not as a limitation to the scope of this invention.

What is claimed is:

1. A valveless fluid damped spring operated device, comprising:
    (a) a viscous liquid having a viscosity of above about 10,000 centistokes and having a substantially constant viscosity-temperature ratio between about −50° C. and 150° C.,
    (b) a housing having a chamber for said viscous liquid,
    (c) a damping means oscillatingly movable in said chamber in said housing and having a blade with a predetermined fixed fluid leakage passageway for said liquid around an edge of said blade and said chamber as the sole means for restricting the oscillating movement of said damping means in said chamber,
    (d) a spring means connected between a portion of said housing and said damping means, and
    (e) means for relatively moving said damping means with respect to said housing in one direction against the action of said spring means, whereby said spring means moves said damping means in the opposite direction restricted by the viscosity of said liquid passing through said fixed passageway.

2. A device according to claim 1 wherein said liquid has a viscosity between about 20,000 and 300,000 centistokes.

3. A device according to claim 1 wherein said housing and said damping means are made of materials having different coefficients of expansion to vary said passageway to compensate for any changes in the viscosity-temperature ratio of said liquid, whereby a substantial constant temperature rate of operation of the device is maintained.

4. A device according to claim 1 wherein said spring means is adjustable to restrict variably the movement of said moving means for said rotor in both directions of its rotation.

5. A door closer comprising the device of claim 1 wherein said moving means comprises a lever, and including bracket means for removably mounting said device on a door, pivoted link means attached to said lever, and a second removable bracket means pivoted to said link means for attaching said link means to a door jamb.

6. A valveless fluid damped spring operated door closer, comprising:
    (a) a viscous liquid having a viscosity of above about 10,000 centistokes and having a substantially constant viscosity-temperature ratio between about −50° C. and 150° C.,
    (b) a housing having a cylindrical chamber for said viscous liquid,
    (c) a damping means oscillatingly movable in said chamber in said housing and having a blade with a predetermined fixed fluid leakage passageway for said liquid around said blade between said damping means and said chamber as the only means for restricting the oscillating movement of said damping means in said chamber,
    (d) an adjustable helical spring connected between a portion of said housing and said damping means,
    (e) lever and pivoted link means for relatively moving said damping means with respect to said housing in one direction against the action of said spring, whereby said spring moves said damping means in the opposite direction restricted by the viscosity of said liquid passing through said fixed passageway, and
    (f) bracket means for attaching said housing and said link means to the door and its jamb.

7. A rotary hydraulic check comprising:
    (a) a stationary casing for a high viscosity liquid,
    (b) a vaned rotor within said casing,
    (c) a stub shaft projecting from one end of said rotor and casing,
    (d) a normally fixed abutment at the other end of said casing,
    (e) torsion spring means connected between said stub shaft and said abutment,
    (f) an operating lever connected to said stub shaft; and
    (g) complementary polygonal interfitting surfaces between said other end of said casing and said normally fixed abutment for axially moving and rotating said abutment to vary the tension on said spring means.

8. A valveless hydraulic check according to claim 7 wherein said casing and said rotor have a predetermined clearance aperture for said fluid to pass between them to restrict the movement of said rotor and said lever attached thereto.

9. A hydraulic check according to claim 7 wherein said spring is mounted within said rotor.

10. A hydraulic check according to claim 7 wherein said casing and said rotor are provided with abutting vanes for limiting the rotation of said rotor therein.

References Cited by the Examiner

UNITED STATES PATENTS

| | | | |
|---|---|---|---|
| 1,701,022 | 2/1929 | Thornton | 16—58 |
| 2,066,795 | 1/1937 | Moore | 16—70 |
| 2,244,254 | 6/1941 | Larson | 16—58 |

FOREIGN PATENTS

| | | |
|---|---|---|
| 1,162,084 | 3/1958 | France. |
| 774,241 | 5/1957 | Great Britain. |

OTHER REFERENCES

Zimmerman and Lavine, Handbook of Material Trade Names (1953), pp. 178, 179.

BOBBY R. GAY, *Primary Examiner.*